United States Patent Office 2,946,700
Patented July 26, 1960

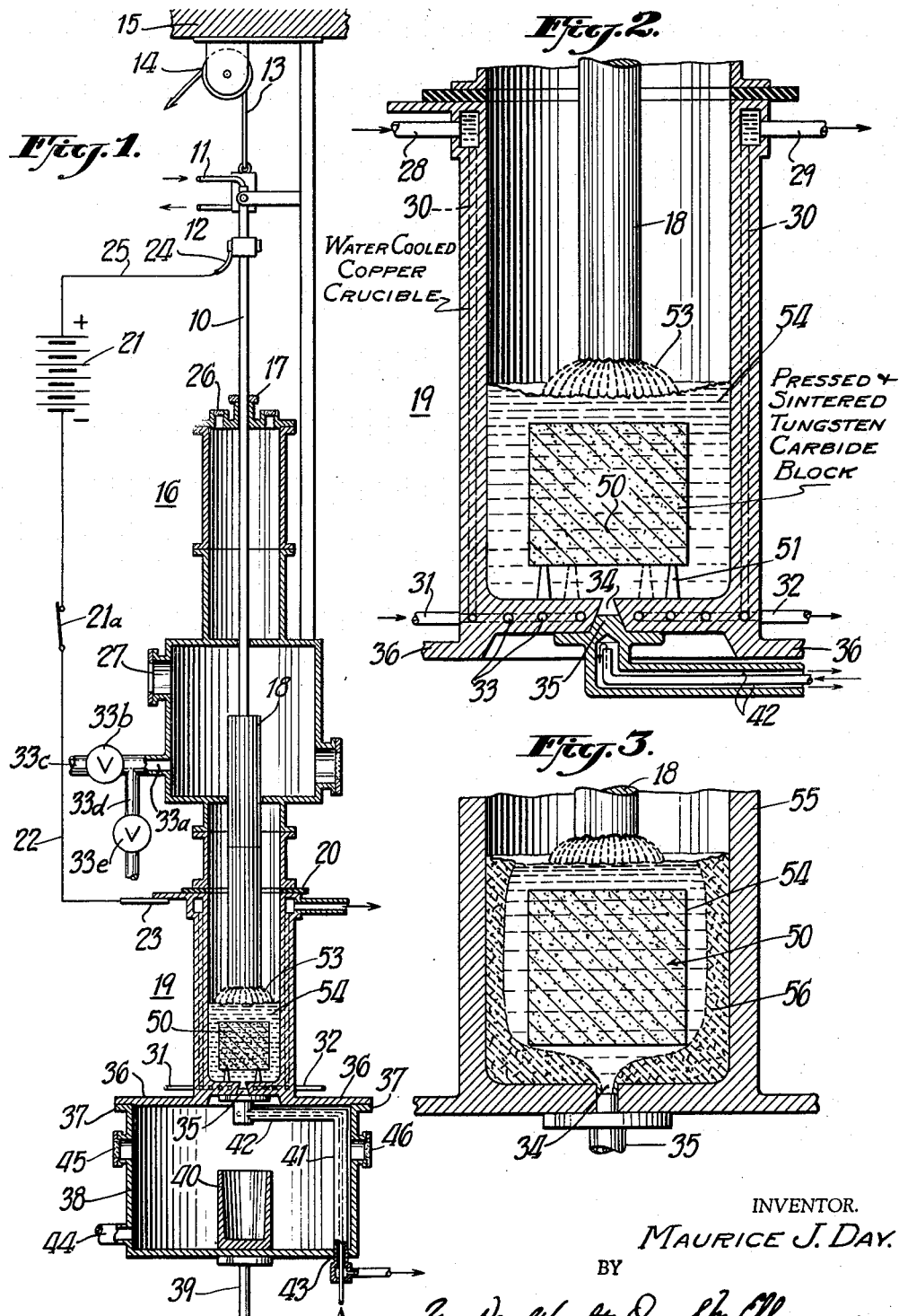

2,946,700

PRODUCTION OF INFILTRATED COMPOSITES

Maurice J. Day, Pittsburgh, Pa., assignor to Crucible Steel Company of America, Pittsburgh, Pa., a corporation of New Jersey Filed Dec. 24, 1957, Ser. No. 705,000

5 Claims. (Cl. 117—66)

This invention pertains to improvements in the production of infiltrated composites comprising an initially porous matrix, formed by pressing or pressing and sintering metal powders of one or any combination of higher melting metals, metal alloys, metal compounds and the like, infiltrated with and bonded by a lower melting metal or metal alloy.

Various methods have heretofore been proposed for producing composites consisting of a matrix of the character aforesaid bonded by a lower melting metal, as by admixing the higher and lower melting constituents in powder form followed by pressing and also sintering above the melting point of the lower melting constituent. Other procedures have consisted in pressing or pressing and sintering the higher melting constituent in powder form into a self-sustaining matrix or body of a desired shape, followed by infiltration with the lower melting metal in various ways as by placing the metal in powder or in bulk form atop the matrix and induction melting the metal whereby it is absorbed into the matrix, or alternatively by immersing the matrix in a molten bath of the metal.

These procedures are satisfactory for the production of small composites or where it is not required that the matrix be completely infiltrated with the infiltrant metal or where no special precautions against atmospheric or other contamination is involved, as where the infiltrant metal is extremely low melting, as in the case of lead or the like.

However, special problems are presented where the matrix body is of large or massive sectional dimensions necessitating infiltration to a considerable depth. Also where one or both the matrix and infiltrant are highly reactive chemically, as in the case of a titanium or titanium alloy powder matrix infiltrated with a lower melting metal such as aluminum, tin, antimony, copper or the like, or where a matrix of tungsten carbide, titanium carbide, or a mixed refractory metal carbide or the like is infiltrated with titanium, zirconium, hafnium, iron, copper, etc., or alloys thereof.

Now I have discovered a method of producing infiltrated composites, which although of general application, is particularly adapted to produce those of the character last mentioned. According to the method of my invention, I first form a porous matrix of the high melting constituent by cold pressing powders thereof into the shape and dimensions desired, and sintering sufficiently for handling, or alternatively hot pressing the powders to shape while thus concurrently sintering. The matrix so formed is placed in the crucible of an electric arc furnace, provided with a consumable electrode composed of the infiltrant metal. The crucible and electrode are housed in a gas-tight chamber connected to evacuating equipment for initiating and conducting the arc melting of the electrode under a high vacuum. With the requisite vacuum applied as discussed below, the arc is struck between the electrode and the matrix body and the electrode rapidly melted down until the matrix is wholly immersed in the molten bath of the infiltrant metal.

The high vacuum applied prior to and during melting draws off the gases evolved by outgassing of the matrix and infiltrant metal as well as gases occluded in the matrix interstices, and thus facilitates penetration of the molten infiltrant into the matrix pores. The high vacuum also accelerates the melting rate of the consumable electrode into a molten bath of superheated metal of extreme fluidity which further assists penetration of the infiltrant metal into the matrix portion. A vacuum of about 30 mm. Hg has been found most effective to achieve these results. The melting is usually continued until the matrix is wholly immersed in the molten bath of the infiltrant metal.

Toward the end of the melting or after the melting is complete, the evacuator is preferably shut off, and an inert gas, such as argon or helium, supplied from a tank under considerable pressure, is fed into the furnace chamber through a control valve, the flow being continued until the pressure within the furnace chamber is at substantially atmospheric pressure or above. The purpose of this is to force the molten infiltrant metal under pressure into the matrix pores as a final stage of infiltration, in order to promote maximum and substantially complete infiltration of the matrix with the infiltrant metal. Sufficient gas pressure is employed to assure this for any particular type of matrix or matrix structure.

When the infiltration is thus complete, the arc is shut off and the excess molten infiltrant metal cast through the bottom of the crucible if a bottom pour type of furnace is employed, or is poured off if the tilting type furnace is utilized.

Where the matrix and infiltrant constituents are relatively non-reactive, a crucible of carbon or other suitable material may be employed. But where one of these constituents, and particularly the infiltrant, is a highly reactive material like titanium, a water-cooled copper crucible is required or, alternatively, a graphite crucible lined with a previously melted skull of a metal which does not react with the matrix or infiltrant constituents. Ordinarily a skull of the infiltrant metal is satisfactory.

Having thus described the invention in general terms, reference will now be had for a more detailed description to the accompanying drawing wherein:

Fig. 1 illustrates the method of the invention as carried out in a consumable electrode, arc melting furnace of the water-cooled copper crucible, bottom pour type operating under vacuum, this being a view in axial sectional elevation; while Fig. 2 is an enlarged showing, also in axial sectional elevation, of the crucible portion of the Fig. 1 showing.

Fig. 3 is a fragmentary showing in axial sectional elevation of a modification of the Fig. 1 showing employing a graphite crucible or the like, optionally lined with a skull, this view showing the lower portion of the crucible and appurtenant components.

Referring to the embodiment for practicing the invention shown in Figs. 1 and 2, there is illustrated a water-cooled electrode holder 10, having inlet and outlet conduits 11, 12 for water flow, the electrode holder being displaceably suspended by means of a cable and pulley 13, 14, from a hoist support 15. The electrode holder extends into a furnace housing 16 through an O-ring seal 17 of rubber or equivalent, and has secured to its lower end a consumable electrode 18 of the infiltrant metal. In the operative condition of the furnace as shown, the electrode 18 extends through the base of the furnace housing 16 and into a water cooled, copper crucible 19. The crucible 19 is electrically insulated from the housing 16 by means of an interposed insulating gasket 20.

The electric power for providing the arc melting as discussed below, is supplied from a direct current source 21, the negative terminal of which is connected through closure contacts of a switch 21a, and thence over lead 22 to the crucible, as at 23, which thus functions as the anode. The electrode holder 10 serves as the cathode and is connected, as at 24, over a lead 25 to the positive terminal of the power supply. Melting progress is observed through a sight glass 26 and window 27 in the furnace housing. The crucible walls and base are water-cooled through inlet, outlet and circulating conduits 28–30, inc., and 31–33, inc., respectively. The furnace chamber is evacuated through a port 33a connected through a valve 33b and over a conduit 33c to any suitable and conventional type of exacuating equipment. The port 33a also serves to introduce inert gas under pressure into the furnace chamber, over conduit 33d containing a valve 33e and extending to a supply of the inert gas under pressure.

The furnace, as stated, is of the bottom pour type, the crucible 19 having extending through its base, an opening or pouring gate 34, normally closed by a removable stopper 35, as described below. The crucible base has integral therewith an outwardly extending flanged portion 36 for engagement with the upper flanged portion 37, of a mold box 38, mounted on an hydraulic jack 39 for elevating the mold box to the operative position shown, and for subsequently lowering the same. The mold box mounts a mold 40 centered directly under the pouring gate 34.

The stopper 35 is carried by the horizontally extending portion of an angle arm 41, as shown, and both the stopper and arm are water cooled, as at 42. The vertical portion of the angle arm is journaled through the base of the mold box, as at 43, and is resiliently supported for axial displacement by suitable spring means (not shown) normally to maintain the stopper in the position shown, but in such a manner as to permit the stopper to be depressed and swung away from the gate 34 by depression and rotation of arm 41. The mold box 38 is evacuated through a port 44 connected to the evacuating apparatus above mentioned. Pouring progress is observed through windows 45, 46 in the mold housing.

In the operation of the furnace of Figs. 1 and 2, for producing infiltrated composites in accordance with the invention, the crucible 19 is disassembled from the housing 16 and the jack 39 lowered to lower the mold box. The consumable electrode 18 is attached to the electrode holder 10, the electrode being then temporarily hoisted into the housing by means of the hoist 13–15, inc. A pressed or pressed and sintered porous matrix 50 to be infiltrated, such as a pressed and sintered shape of tungsten carbide, silicon carbide, or iron, stainless steel or the like, is placed in the crucible, either resting on its base or on supports, as at 51, which can be of the same material as the matrix, and the furnace components are then assembled to the operative condition shown in the drawing. The furnace chamber and mold box are thereupon evacuated, to preferably about 30 mm. Hg, through ports 33a and 38, valve 33b being, of course, open at this stage, and valve 33e closed. Power is then applied by closure of the power supply switch 21a, and electrode 18 is lowered into contact with the matrix 50 for striking the arc, which is thereafter regulated, as at 53, rapidly to melt down the electrode to form a deep molten pool 54 of the infiltrant metal in which the matrix 50 is preferably completely immersed as shown. In case the matrix is not sufficiently conductive electrically for striking the arc, as with a matrix of silicon carbide or the like, it is necessary initially to encase it in a shell of conducting material, such as a shell of the metal used in the consumable electrode.

During the initial stages of the melting considerable outgassing of the consumable electrode and matrix is apt to occur, which gases are drawn off through the exhaust port 33a as are also the gases occluded in the matrix pores. As the melting proceeds, the molten infiltrant metal is absorbed into the matrix pores by capillary action. When maximum absorption is secured in this way, valve 33b in the exhaust conduit 33c is closed and valve 33e is opened to introduce the inert gas, such as argon or helium into the furnace chamber, until the pressure therein is substantially atmospheric or above in order to force the molten infiltrant metal into the matrix interstices to assure maximum or substantially complete infiltration.

After the infiltration is complete, the arc is extinguished and the electrode 18 raised from the crucible. The stopper 35 is swung away from the pouring gate 34, thus to cast the excess infiltrant metal into the mold 40. When the furnace has cooled down, it is disassembled and the infiltrated composite removed. The infiltrant metal cast into the mold may of course be remelted into a consumable electrode for re-use.

Where the matrix and infiltrant are relatively non-reactive as, for example, in the case of a tungsten or silicon carbide matrix infiltrated with cobalt, nickel, manganese, copper or the like, a crucible of carbon or other suitable material may be employed, as shown at 55 in Fig. 3. No water cooling is required for such a crucible. A crucible of this type is preferred where applicable as compared to the water-cooled copper crucible of Figs. 1 and 2, owing to the hazard as to the latter, that the arc may wander and burn through the crucible wall, with resulting damage or possibly explosion due to water seepage into the furnace.

The carbon crucible may also be employed even where either or both the infiltrant and matrix materials are highly reactive chemically, if the crucible is lined with a relatively thick walled skull of the infiltrant metal or of some other metal which is non-reactive to the matrix and infiltrant materials. Such a skull is shown at 56 in Fig. 3, and may be produced by first arc melting the central portion of a comminuted charge of the skull metal, but so controlling the positioning and heating action of the arc as to leave a relatively thick walled portion of the charge adjacent the crucible, unmelted to provide the skull portion 56. The molten central portion of the charge is then melted through to the pouring gate 34, and the stopper 35 removed to discharge the molten metal into the mold 40, Fig. 1, leaving the skull 56 in situ. During this initial melting to form the skull, a non-consumable electrode such as tungsten, may be employed for producing the arc.

The thus skull-lined crucible is now ready for producing an infiltrated composite according to the invention, which procedure is carried out in the identical way above described with reference to Figs. 1 and 2. That is to say, with the furnace disassembled, the matrix 50 is placed within the skull and the furnace then assembled and operated as above described, this time, however, employing a consumable electrode of the infiltrant metal as the arc electrode. Since during this second melting, the molten pool 54 of the infiltrant metal contacts only the inner wall of the skull 56, with which it is non-reactive, no contamination of the infiltrant occurs, such as might otherwise be transferred to and absorbed by the matrix.

For example, where a titanium carbide matrix is to be infiltrated with a reactive material like titanium or a titanium base alloy, the skull can be produced from titanium sponge or from chips of the titanium base alloy in question. During the second melting for infiltrating the matrix, the molten pool of the infiltrant metal will contact only the titanium or titanium alloy skull and hence will remain free from contamination by the carbon or graphite crucible.

What is claimed is:
1. The method of producing infiltrated composites comprising an initially porous matrix of higher melting material infiltrated with a lower melting metal, which comprises: arc melting a consumable electrode composed of said infiltrant metal to form a molten pool thereof in which said matrix is immersed and while maintaining a substantially subatmospheric pressure surrounding said arc and matrix during at least the initial portion of said melting, thereupon increasing said pressure sufficiently to force the molten infiltrant metal into the pores of said matrix to the maximum extent, and thereupon removing the excess molten infiltrant metal.

2. The method of producing infiltrated composites comprising a matrix of a higher melting material having interconnecting interstices infiltrated with a lower melting metal and by means of a consumable electrode arc furnace including a crucible housed in a substantially gas-tight chamber, said method comprising: arc melting a consumable electrode of said infiltrant metal to form a molten pool thereof immersing said matrix disposed in said crucible and while maintaining the pressure within said chamber substantially below atmospheric pressure during at least the initial portion of said melting, thereupon increasing the pressure within said chamber sufficiently to force the molten infiltrant metal into the interstices of said matrix to the maximum extent, and thereupon removing the excess molten infiltrant metal.

3. The method of producing infiltrated composites comprising a multi-cellular matrix of a higher melting material infiltrated with a lower melting metal, and by employment of a consumable electrode arc melting furnace including a metal crucible cooled by a circulating coolant, at least one of said matrix and infiltrant constituents being highly reactive chemically, said method comprising: arc melting a consumable electrode of said infiltrant metal to form a molten pool thereof immersing said matrix disposed in said crucible and while maintaining the pressure within said chamber substantially below atmospheric pressure during at least the initial portion of said melting, thereupon introducing an inert gas under pressure into said chamber until the pressure within the chamber is increased sufficiently to force the molten infiltrant metal into the cells of said matrix to the maximum extent, and thereupon removing the excess molten infiltrant metal.

4. The method of producing infiltrated composites comprising a matrix of a higher melting material having interconnecting interstices infiltrated with a lower melting metal and by means of a consumable electrode arc furnace including a crucible housed in a substantially gas-tight chamber, said method comprising: forming said matrix from powders of said high melting material by pressure and heat into a porous, self-sustaining body, depositing said body in said crucible, arc melting a consumable electrode of said infiltrant metal to form a molten pool thereof immersing said matrix disposed in said crucible and while maintaining the pressure within said chamber substantially below atmospheric pressure during at least the initial portion of said melting, thereupon increasing the pressure within said chamber sufficiently to force the molten infiltrant metal into the interstices of said matrix to the maximum extent, and thereupon removing the excess molten infiltrant metal.

5. The method of producing infiltrated composites comprising a multi-cellular matrix of a higher melting material infiltrated with a lower melting metal, and by employment of a consumable electrode arc melting furnace including a metal crucible cooled by a circulating coolant, at least one of said matrix and infiltrant constituents being highly reactive chemically, said method comprising: forming said matrix from powders of said high melting material by pressure and heat into a porous, self-sustaining body, depositing said body in said crucible, arc melting a consumable electrode of said infiltrant metal to form a molten pool thereof immersing said matrix disposed in said crucible and while maintaining the pressure within said chamber substantially below atmospheric pressure during at least the initial portion of said melting, thereupon introducing an inert gas under pressure into said chamber until the pressure within the chamber is increased sufficiently to force the molten infiltrant metal into the cells of said matrix to the maximum extent, and thereupon removing the excess molten infiltrant metal.

References Cited in the file of this patent

UNITED STATES PATENTS

| | | |
|---|---|---|
| 2,191,472 | Hopkins | Feb. 27, 1940 |
| 2,192,792 | Kurtz | Mar. 5, 1940 |
| 2,612,443 | Goetzel et al. | Sept. 30, 1952 |
| 2,776,886 | Kelley et al. | Jan. 8, 1957 |
| 2,828,225 | Goetzel et al. | Mar. 25, 1958 |